United States Patent
Morin

(10) Patent No.: US 7,543,879 B2
(45) Date of Patent: Jun. 9, 2009

(54) WINDSHIELD MOUNTING SYSTEM

(75) Inventor: Vincent Morin, St-Charles-de-Drummond (CA)

(73) Assignee: Soucy International Inc., Drummondville, Quebec (CA)

( * ) Notice: Subject to any disclaimer, the term of this patent is extended or adjusted under 35 U.S.C. 154(b) by 0 days.

(21) Appl. No.: 11/952,605

(22) Filed: Dec. 7, 2007

(65) Prior Publication Data

US 2008/0136209 A1 Jun. 12, 2008

(30) Foreign Application Priority Data

Dec. 7, 2006 (CA) ................................... 2570249

(51) Int. Cl.
*B62J 17/04* (2006.01)
(52) U.S. Cl. .................................. 296/78.1; 296/96.21
(58) Field of Classification Search ................ 296/78.1, 296/84.1, 1.07, 77.1, 96.21
See application file for complete search history.

(56) References Cited

U.S. PATENT DOCUMENTS

| | | | | |
|---|---|---|---|---|
| 1,532,008 A | * | 3/1925 | Walford | 296/78.1 |
| 4,269,445 A | * | 5/1981 | Gager, Jr. | 296/78.1 |
| 4,379,584 A | * | 4/1983 | Willey | 296/78.1 |
| 4,489,973 A | * | 12/1984 | Willey | 296/78.1 |
| 5,732,965 A | * | 3/1998 | Willey | 280/288.4 |
| 6,505,877 B1 | * | 1/2003 | Devlin et al. | 296/78.1 |
| 7,090,280 B2 | * | 8/2006 | Willey | 296/78.1 |
| 7,104,585 B2 | * | 9/2006 | Miura et al. | 296/78.1 |
| 7,360,819 B1 | * | 4/2008 | Hahne | 296/78.1 |
| 2002/0074820 A1 | * | 6/2002 | Gagne | 296/92 |
| 2004/0169392 A1 | * | 9/2004 | Suzuki | 296/78.1 |
| 2004/0183332 A1 | * | 9/2004 | Barber et al. | 296/78.1 |
| 2005/0146154 A1 | * | 7/2005 | Suzuki | 296/78.1 |
| 2006/0208522 A1 | * | 9/2006 | Gray et al. | 296/78.1 |

* cited by examiner

*Primary Examiner*—Jason S Morrow
(74) *Attorney, Agent, or Firm*—Robert Brouillette; Brouillette & Partners LLP

(57) ABSTRACT

The present invention provides a system for mounting a windshield onto small vehicles such as all-terrain vehicles, snowmobiles or other similar vehicles. The mounting system generally comprises a pair of receiving elements, each of them being adapted to be mounted to the vehicle and comprising a receiving cavity. The mounting system also comprises a windshield support frame which is adapted to support a windshield panel and which also comprises a pair of mounting elements or protuberances receivable in the receiving cavities of the receiving elements. Once the mounting elements are received in the receiving cavities, the frame is fixedly retained on the receiving elements by a pair of locking mechanisms. By a simple actuation of the locking means, the windshield panel and its support frame can easily be installed or removed from the vehicle.

15 Claims, 1 Drawing Sheet

WINDSHIELD MOUNTING SYSTEM

CROSS-REFERENCE TO RELATED APPLICATIONS

The present patent application claims the benefits of priority of commonly assigned Canadian Patent Application No. 2,570,249, filed on Dec. 7, 2006, at the Canadian Intellectual Property Office.

FIELD OF THE INVENTION

The present invention generally relates to accessories for small vehicles. More particularly, the present application relates to supports for windshields and other similar apparatuses for all-terrain vehicles, snowmobiles and other similar vehicles.

BACKGROUND OF THE INVENTION

Nowadays, there is an ever-increasing number of people which enjoy riding all-terrain vehicles and other similar off-road vehicles, either in trails specifically designed for this sport or even on totally uncharted terrain.

In order to adapt the vehicles to the increasing variety of terrain onto which they are ridden, companies have long been offering after-market accessories such as support racks, supplementary seats, trailer hitches, traction kits and so on.

Since these vehicles are generally subjected to shocks and vibrations, it is important that the accessories mounted to the vehicles be relatively fixedly mounted in order to prevent accidental failure or removal.

In the particular case of windshields, this is of utmost importance since the windshield generally protects the rider of the vehicle. Nevertheless, on some occasions, it would be practical to be able to remove the windshield, at least temporarily, in order to avoid damaging it. For example, when there are low branches partially blocking a trail or when the vehicle must be stored or loaded onto a trailer for transport.

Unfortunately, in the prior art, the only way to remove a windshield from the vehicle to which it was installed was to physically remove its supports from the handle bar of the steering assembly onto which they were usually mounted. This process was usually effected via the use of tools. Still, this process could not only be time consuming, it could can also be impossible when no tools were immediately available.

There is thus a need for a novel support system which allows easy mounting and removal of a windshield onto a small vehicle and which also generally obviates the aforementioned drawbacks.

SUMMARY OF THE INVENTION

Hence, in accordance with the present invention, a novel windshield mounting system is provided. As used hereinabove and hereinafter, the term windshield must be construed broadly as to encompass, in addition to regular windshield panel, any other similar apparatuses.

The mounting system of the present invention generally comprises at least one but preferably a pair of receiving elements adapted to be fixedly mounted to the front portion of the vehicle. Preferably, but not exclusively, the receiving elements are mounted to the steering assembly of the vehicle and, in some case, to the handle bar or bars thereof. Each of the receiving elements is further provided with an end face having therein a receiving cavity extending into the receiving element and having preferably a tapered configuration.

The mounting system also comprises a support frame for supporting the windshield panel via fasteners known in the art. Though generally provided as a single component part, the frame could alternatively be provided as a plurality of component parts. In another variant, the frame could be unitary with the windshield panel. The present invention is therefore not so limited.

In order to be securely mounted to the receiving elements, the frame is provided with at least one but preferably a pair of downwardly extending mounting elements or protuberances which are configured to be matingly received into the respective receiving cavities of the receiving elements. Hence, the configurations of the receiving cavities and of the mounting elements are preferably complementary in order to provide a secure engagement therebetween.

In order to lock the support frame to the receiving elements, both the support frame and the receiving elements are preferably provided with locking apertures which are engageable by locking means known in the art for other uses. Still, other configurations of locking arrangements are possible and within the scope of the invention.

In accordance with an important aspect of the present invention, in the mounting configuration hereinabove described, the weight of the support frame and its associated windshield panel is supported mostly by the end faces of the receiving elements and preferably not by the locking means. The locking means are thereby less prone to breakage.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel mounting system for windshield and other similar protection apparatuses will be described hereinafter. Although the invention is described in terms of specific illustrative embodiments, it is to be understood that the embodiments described herein are by way of example only and that the scope of the invention is not intended to be limited thereby.

Figure 1:
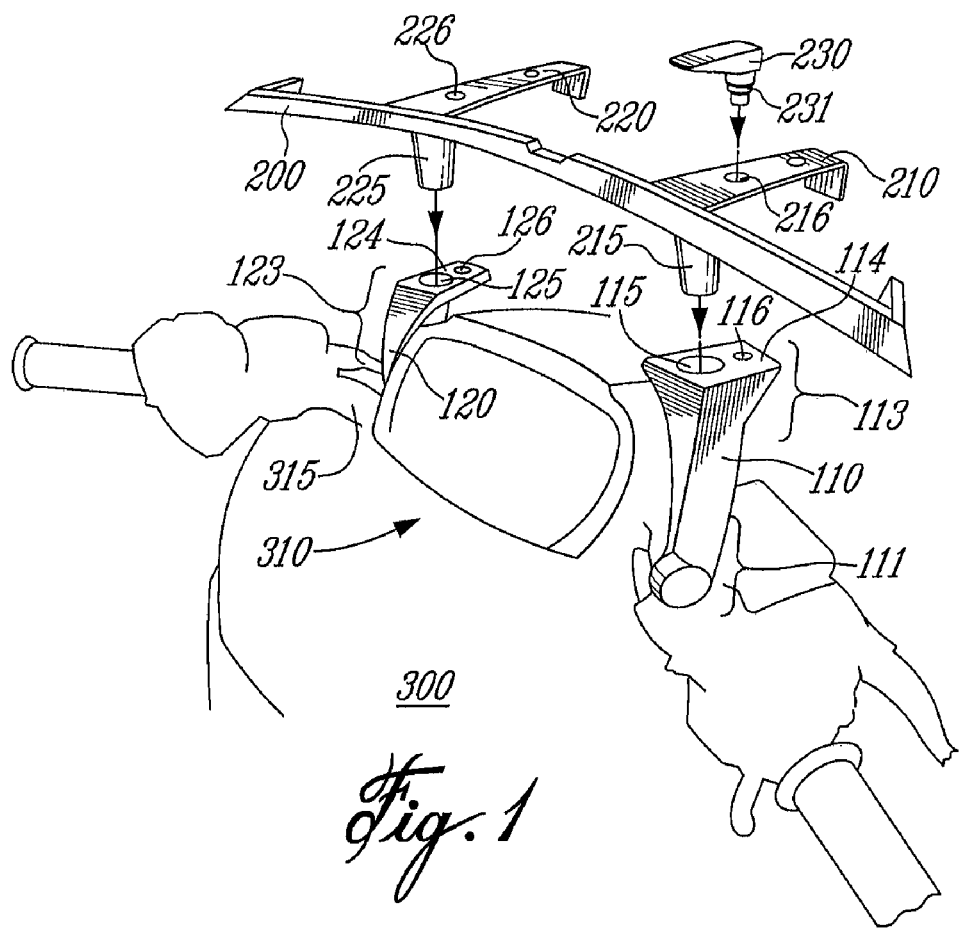
FIG. 1 is a fragmentary exploded view of the mounting system of the present invention.

Referring first to FIG. 1, the mounting system of the present invention is shown. The mounting system generally comprises two receiving elements 110 and 120 which are adapted to be fixedly mounted to the steering assembly 310 of a vehicle 300 and preferably to the handle bar or bars 315 thereof. In FIG. 1, the vehicle is an ATV. Nevertheless, other small vehicles such as snowmobiles could be advantageously equipped with the mounting system of the present invention. The system also generally comprises a support frame or bracket 200, adapted to support a windshield panel, which can be removably mounted to the receiving elements 110 and 120.

In more details, receiving element 110 is generally an elongated element, preferably but not exclusively made of polymer, having a lower portion 111 and an upper 113. The lower portion 111 is generally adapted to be fixedly mounted to the handle bar 315 of the vehicle 300, preferably with appropriate fastening means known in the art. Understandably, the exact configuration of the lower portion 111 can vary according to the particular shape and/or design of the handle bar 315. Moreover, the exact type of fastening means used can differ according to the particular shape and/or design of the handle bar 315. Finally, the lower portion 111 could also be mounted to other components of the steering assembly 310 or even to the front portion of the frame of the vehicle 300. The present invention is not so limited.

Figure 2:
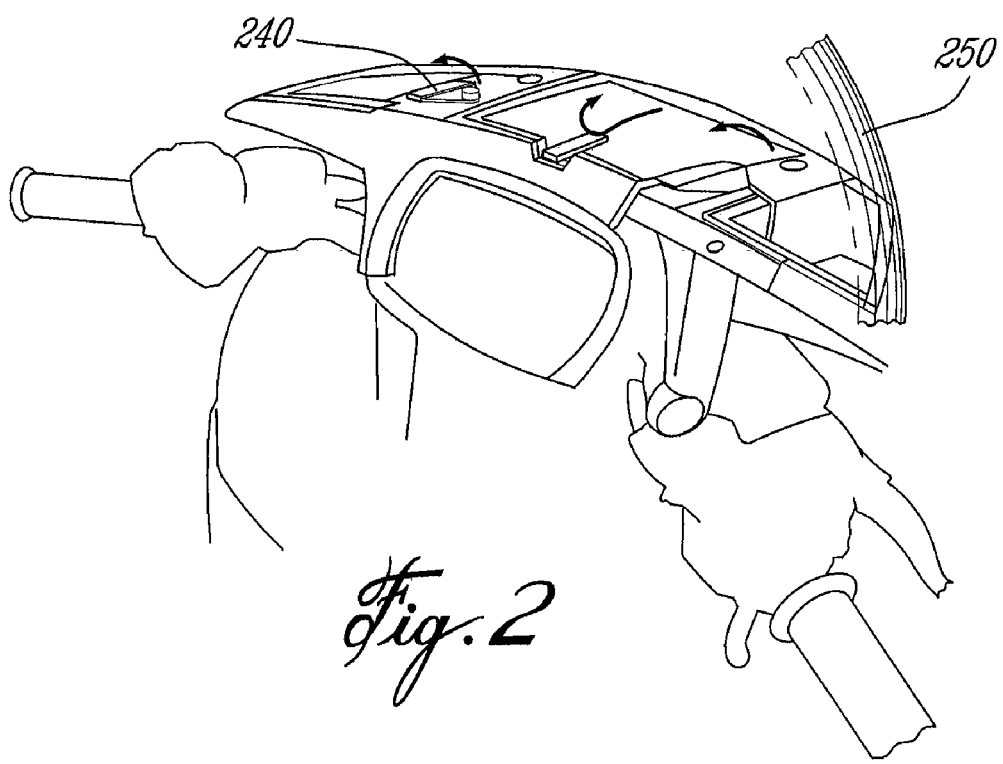
FIG. 2 is a fragmentary perspective view of the mounting system of the present invention as mounted onto a vehicle partially shown.

The upper portion 113 is generally ended by an end face 114 which comprises a receiving cavity 115 and a first locking aperture 116. The end face 114 is configured such that the support frame 200 (described in more details below) will rest thereon when the support frame 200 is mounted to the receiving element 110 (see FIG. 2). The receiving cavity 115 is generally of frustro-conical configuration and therefore tapers as it extending into the upper portion 113. The shape of the receiving cavity 115 is generally chosen to ease the insertion of the mounting element 215 of the support frame 200. The first locking aperture 116 is generally adapted to receive a portion of the locking means 230 of the support frame 200 in order to fixedly yet removably mount the frame 200 to the receiving element 110. The skilled addressee will understand that the configuration of the first locking aperture 116 may vary according to the type of locking means 230 used in the system.

In a generally symmetrical arrangement, the receiving element 120 is also provided as an elongated element, preferably but not exclusively made of polymer, having a lower portion 121 (hidden in FIG. 1) and an upper portion 123. As for the receiving element 110, the lower portion 121 of receiving element 120 is generally adapted to be fixedly mounted to the steering assembly 310 of the vehicle 300 and preferably to the handle bar or bars 315 thereof with fastening means known in the art.

As for upper portion 113, the upper portion 123 is also ended by an end face 124 which comprises a receiving cavity 125 and a second locking aperture 126. As for end face 114, the end face 124 is also configured such that the support frame 200 will rest thereon when the support frame 200 is mounted to the receiving element 120 (see FIG. 2). The receiving cavity 125 is also generally of frustro-conical configuration and therefore tapers as it extending into the upper portion 123. Understandably, the shape of the receiving cavity 125 is generally chosen to ease the insertion of the mounting element 225 of the support frame 200 (described in more details below). Concerning the second locking aperture 126, it is generally adapted to receive a portion of the locking means 240 of the support frame 200 in order to fixedly yet removably mount the frame 200 to the receiving element 120. The skilled addressee will understand that the configuration of the second locking aperture 126 may vary according to the type of locking means 240 used in the system. Preferably, the second locking aperture 126 is of a configuration similar the first locking aperture 116.

Though the receiving cavities 115 and 125 described above are preferably of similar configuration, they could also be different in order to prevent mistaken or erroneous installation of the frame 200. Moreover, other preferably tapered though not frustro-conical configurations could also be used without departing from the scope of the invention.

Still referring to FIG. 1, the support frame 200 of the mounting system will now be described.

According to the preferred embodiment shown in FIG. 1, the support frame 200 is generally provided as a single laterally extending mounting bracket, preferably made of strong material such as metal. Understandably, the frame 200 could alternatively be provided as a plurality of component parts or mounting brackets or even be unitary with the windshield panel 250, the invention is generally not so limited. The frame 200 generally comprises two forwardly extending portions 210 and 220 equipped with mounting apertures for receiving fasteners used to mount the windshield panel 250 to the frame 200. Additional mounting apertures are also disposed along the frame 200.

According to the present invention, the frame 200 further comprises a pair of mounting elements or protuberances 215 and 225, generally mounted thereto, which are downwardly extending therefrom and which are respectively adapted to be received in receiving cavities 115 and 125. The mounting elements 215 and 225 are preferably made of metal though they could also be made of other material such as strong polymer. The shape of the mounting elements 215 and 225 are therefore generally complementary with the shape of the receiving cavities 115 and 125. Hence, the mounting elements 215 and 225 are preferably of frustro-conical configuration. Still, the skilled addressee will understand that as long as the mounting elements 215 and 225 are substantially complementary with the receiving cavities 115 and 125, no specific shape is generally required.

As mentioned above, the frame 200 comprises two forwardly extending portions 210 and 220. Each of these portions comprises respective third and fourth locking apertures 216 and 226. These apertures 216 and 226 are designed to be respectively aligned with first and second locking apertures 116 and 126 when the mounting elements 215 and 225 are received in the receiving cavities 115 and 125.

In order to lock the frame 200, and its associated windshield 250, to the receiving elements 110 and 120, the third and fourth locking apertures are provided with locking means 230 and 240, preferably engaged therein and extending therethrough. The locking means 230 and 240 are further adapted, through there respective protrusion 231 and 241 (protrusion 241 is hidden in FIG. 2), to engage respectively the first and the second locking apertures in a locking arrangement.

Locking means 230 and 240 are preferably hand actuated in order to ease the installation and removal of the windshield.

Though the locking arrangements between the first, second, third and fourth locking apertures and the locking means 230 and 240 have been described with a certain degree of particularity according to the preferred embodiment of the present invention, it is to be understood that other equivalent locking arrangements could be used instead without departing from the scope of the invention.

According to the mounting system of the present invention, the weight of the frame 200 and the windshield panel 250 is advantageously not supported by the locking means but instead, by the end face 114 and 124 and also by the receiving cavities 115 and 125 via the mounting elements 215 and 225. Hence, the locking means are generally not subjected to strains and therefore, they are less prone to accidental breakage.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A windshield mounting system for a vehicle, said mounting system comprising a first receiving element adapted to be mounted to said vehicle and comprising a first end face having therein a first substantially tapered receiving cavity, and a support frame for supporting a windshield panel, said support frame comprising a first substantially tapered mounting element adapted to be received into said first receiving cavity, whereby said support frame rests on said first end face when said first mounting element is received into said first receiving cavity such that the weight of said support frame is at least partially born by said first end face.

2. A windshield mounting system as claimed in claim 1, wherein said first receiving cavity and said first mounting element are of substantially complementary configuration.

3. A windshield mounting system as claimed in claim 1, wherein said first receiving cavity and said first mounting element are of substantially frustro-conical configuration.

4. A windshield mounting system as claimed in claim 1, wherein said frame comprises a single mounting bracket.

5. A windshield mounting system as claimed in claim 1, wherein said frame comprises a plurality of mounting brackets.

6. A windshield mounting system as claimed in claim 1, wherein said frame and said windshield panel are unitary.

7. A windshield mounting system as claimed in claim 1, wherein said mounting system further comprises a second receiving element adapted to be mounted to said vehicle and comprising a second end face having therein a second substantially tapered receiving cavity, and wherein said support frame further comprises a second substantially tapered mounting element which is adapted to be received into said second receiving cavity, whereby said support frame rests on said first and second end faces when said first mounting element is received into said first receiving cavity and said second mounting element is received into said second receiving cavity such that the weight of said support frame is substantially born by said first and second end faces.

8. A windshield mounting system as claimed in claim 7, wherein said second receiving cavity and said second mounting element are of substantially complementary configuration.

9. A windshield mounting system as claimed in claim 7, wherein said second receiving cavity and said second mounting element are of substantially frustro-conical configuration.

10. A windshield mounting system as claimed in claim 1, further comprising at least one locking mechanism for releasably securing said support frame to said first receiving element.

11. A windshield mounting system as claimed in claim 7, further comprising at least one locking mechanism for releasably securing said support frame to said first and second receiving elements.

12. A windshield mounting system for a vehicle having a forward portion and a rearward portion, said mounting system comprising:
   a. at least a first receiving element mountable to said forward portion of said vehicle, said first receiving element comprising a first receiving cavity of frustro-conical configuration;
   b. a support frame for supporting a windshield panel, said support frame comprising at least a first mounting element, said at least first mounting element being receivable into said first receiving cavity;
   c. first locking means adapted to engage said support frame and said first receiving element in a locking arrangement;

whereby the weight of said support frame is substantially born by said at least first receiving element.

13. A windshield mounting system as claimed in claim 12, wherein said first mounting element is of frustro-conical configuration.

14. A windshield mounting system for a vehicle having a forward portion and a rearward portion, said mounting system comprising:
   a. a first receiving element mountable to said forward portion of said vehicle, said first receiving element comprising a first receiving cavity of frustro-conical configuration;
   b. a second receiving element mountable to said forward portion of said vehicle, said second receiving element comprising a second receiving cavity of frustro-conical configuration;
   c. a support frame for supporting a windshield panel, said support frame comprising first and second mounting elements, said first and second mounting elements being receivable into respectively said first receiving cavity and said second receiving cavity;
   d. first locking means adapted to engage said support frame and said first receiving element in a locking arrangement;
   e. second locking means adapted to engage said support frame and said second receiving element in a locking arrangement;

whereby the weight of said support frame is substantially born by said first and second receiving elements.

15. A windshield mounting system as claimed in claim 14, wherein said first mounting element and said second mounting element are of frustro-conical configuration.

* * * * *